United States Patent
Bamidele et al.

(10) Patent No.: US 8,212,891 B2
(45) Date of Patent: Jul. 3, 2012

(54) APPARATUS, METHODS AND COMPUTER READABLE STORAGE MEDIUMS

(75) Inventors: Adetokunbo Bamidele, Ipswich (GB); Aaron Licata, Wembley Park (GB); Christophe Marle, San Francisco, CA (US)

(73) Assignee: Nokia Corporation, Espoo (FI)

( * ) Notice: Subject to any disclaimer, the term of this patent is extended or adjusted under 35 U.S.C. 154(b) by 352 days.

(21) Appl. No.: 12/459,081

(22) Filed: Jun. 26, 2009

(65) Prior Publication Data

US 2010/0328488 A1  Dec. 30, 2010

(51) Int. Cl.
*H04N 5/235*  (2006.01)

(52) U.S. Cl. .................................... 348/229.1

(58) Field of Classification Search ............... 348/229.1, 348/208.12, 221.1, 345–347, 362
See application file for complete search history.

(56) References Cited

U.S. PATENT DOCUMENTS

| 5,255,044 A | 10/1993 | Ishiguro | 354/402 |
| 2004/0141075 A1* | 7/2004 | Xu et al. | 348/296 |
| 2005/0128310 A1* | 6/2005 | Egawa | 348/208.12 |
| 2007/0242936 A1* | 10/2007 | Chujo et al. | 396/55 |

FOREIGN PATENT DOCUMENTS

| JP | 200004394 A | 1/2000 |
| JP | 2008164731 A | 7/2008 |
| WO | WO 2007/064495 A2 | 6/2007 |

* cited by examiner

Primary Examiner — Jason Chan
Assistant Examiner — Stephen Coleman
(74) Attorney, Agent, or Firm — Harrington & Smith

(57) ABSTRACT

A method including receiving an image from an image sensor, the image including a portion corresponding to an object; determining distance of the object from the image sensor using the received image; and controlling exposure of the image sensor using the determined distance.

20 Claims, 3 Drawing Sheets

APPARATUS, METHODS AND COMPUTER READABLE STORAGE MEDIUMS

FIELD OF THE INVENTION

Embodiments of the present invention relate to apparatus, methods and computer readable storage mediums. In particular, they relate to apparatus, methods and computer readable storage mediums in a mobile cellular telephone.

BACKGROUND TO THE INVENTION

Apparatus, such as mobile cellular telephones, may include a camera that enables a user to obtain and store images and videos. The apparatus may be moved into a variety of locations that may each have a different background light intensity. For example, an indoors location may have relatively low background light intensity from artificial light whereas an outdoors location may have a relatively high background light intensity from sunlight. The camera may be unable to adapt its exposure (aperture size and/or length of exposure time) satisfactorily for changes in the background light intensity and the image/video may include areas that are overexposed (bright) or underexposed (dark) causing an undesired loss of texture detail. The loss of detail might be imperceptible to humans, but crucial to machine-based image recognition.

Therefore, it would be desirable to provide an alternative apparatus.

BRIEF DESCRIPTION OF VARIOUS EMBODIMENTS OF THE INVENTION

According to various, but not necessarily all, embodiments of the invention there is provided a method comprising: receiving an image from an image sensor, the image including a portion corresponding to an object; determining distance of the object from the image sensor using the received image; and controlling exposure of the image sensor using the determined distance.

According to various, but not necessarily all, embodiments of the invention there is provided apparatus comprising: a processor configured to receive an image from an image sensor, the image including a portion corresponding to an object; determine distance of the object from the image sensor using the received image; and control exposure of the image sensor using the determined distance.

The apparatus may be for wireless communications. The apparatus may be for obtaining an image of one or more objects.

According to various, but not necessarily all, embodiments of the invention there is provided a computer readable storage medium encoded with instructions that, when executed by a processor, perform: receiving an image from an image sensor, the image including a portion corresponding to an object; determining distance of the object from the image sensor using the received image; and controlling exposure of the image sensor using the determined distance.

BRIEF DESCRIPTION OF THE DRAWINGS

For a better understanding of various examples of embodiments of the present invention reference will now be made by way of example only to the accompanying drawings in which.

DETAILED DESCRIPTION OF VARIOUS EMBODIMENTS OF THE INVENTION

Figure 1:
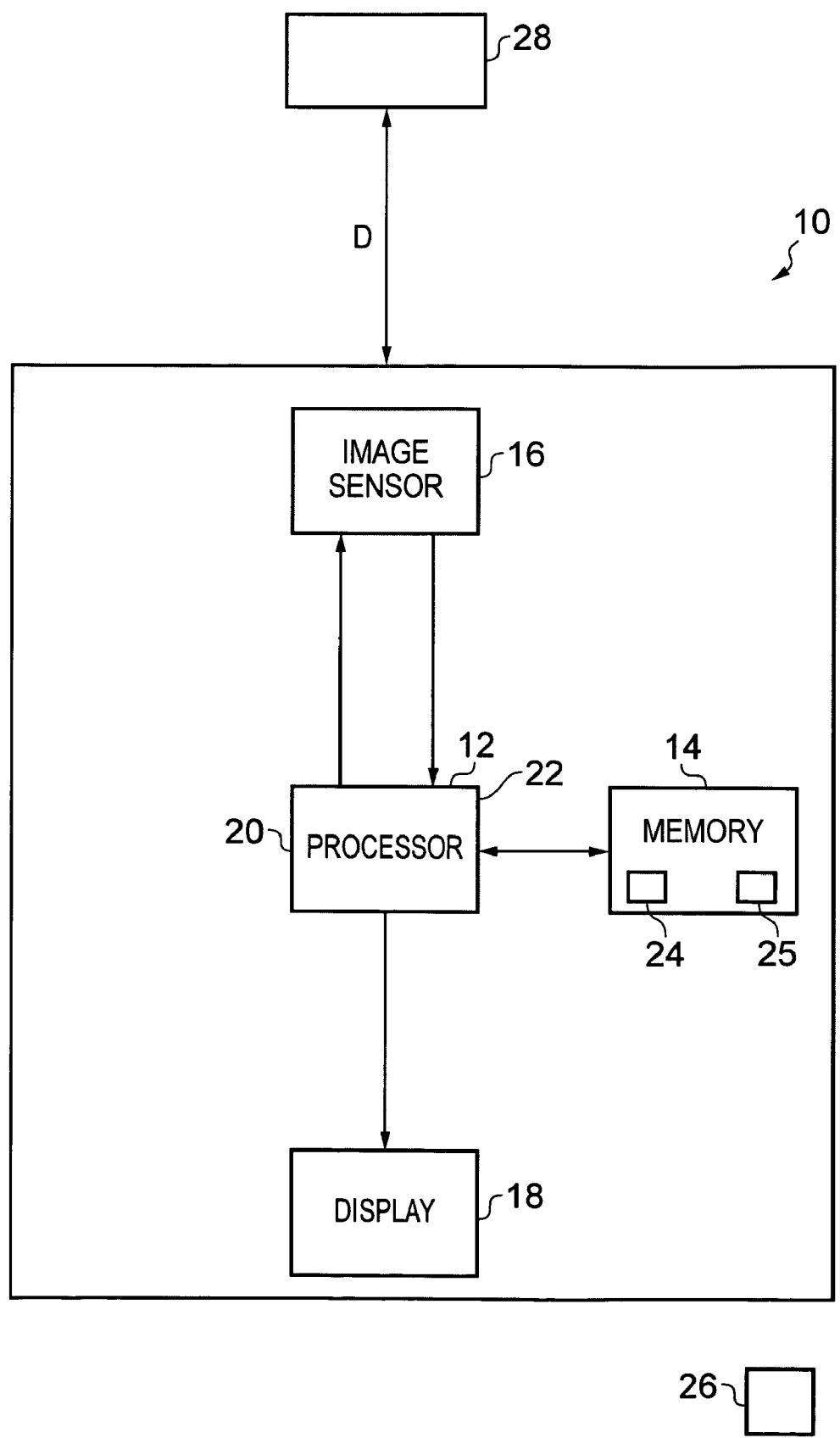
FIG. 1 illustrates a schematic diagram of an apparatus according to various embodiments of the invention.

FIG. 1 illustrates an apparatus 10 comprising: a processor 12 configured to receive an image from an image sensor 16, the image including a portion corresponding to an object 28; determine distance of the object 28 from the image sensor 16 using the received image; and control exposure of the image sensor 16 using the determined distance.

In the following description, the wording 'connect' and 'couple' and their derivatives mean operationally connected/coupled. It should be appreciated that any number or combination of intervening components can exist (including no intervening components).

In more detail, FIG. 1 illustrates a schematic diagram of an apparatus 10 according to various embodiments of the invention. The apparatus 10 includes a processor 12, a memory 14, an image sensor 16, and a display 18

The apparatus 10 may be any device and may be a portable device. The apparatus 10 may be, for example, a mobile cellular telephone, a personal digital assistant (PDA), a portable internet appliance, a hand-held computer, digital video and/or still camera, wearable computer, or a module for such devices. As used here 'module' refers to a unit or apparatus that excludes certain parts/components that would be added by an end manufacturer or a user.

The processor 12 may be any suitable processor and may be a microprocessor for example. The implementation of the processor 12 can be in hardware alone (a circuit for example), have certain aspects in software including firmware alone or can be a combination of hardware and software (including firmware).

The processor 12 may be implemented using instructions that enable hardware functionality, for example, by using executable computer program instructions in a general-purpose or special-purpose processor that may be stored on a computer readable storage medium (disk, memory etc) to be executed by such a processor.

The processor 12 is configured to read from and write to the memory 14. The processor 12 may also comprise an output interface 20 via which data and/or commands are output by the processor 12 and an input interface 22 via which data and/or commands are input to the processor 12.

The memory 14 may be any suitable memory and may, for example be permanent built-in memory such as flash memory or it may be a removable memory such as a hard disk, secure digital (SD) card or a micro-drive. The memory 14 stores a computer program 24 comprising computer program instructions that control the operation of the apparatus 10 when loaded into the processor 12. The computer program instructions 24 provide the logic and routines that enables the apparatus 10 to perform the method described below in relation to FIG. 2.

The computer program 24 may arrive at the apparatus 10 via any suitable delivery mechanism 26. The delivery mechanism 26 may be, for example, a computer-readable storage medium, a computer program product, a memory device, a record medium such as a Blue-ray disk, CD-ROM or DVD, an article of manufacture that tangibly embodies the computer program 24. The delivery mechanism 26 may be a signal configured to reliably transfer the computer program 24. The apparatus 10 may propagate or transmit the computer program 24 as a computer data signal.

Although the memory 14 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other devices. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The image sensor 16 may be any suitable sensor for receiving electromagnetic radiation (visible light for example) and converting the received electromagnetic radiation into a signal. The image sensor 16 may include a plurality of sensor elements that shall hereinafter be referred to as 'pixels'. The processor 12 is configured to receive signals from the image sensor 16 and to control the exposure of the image sensor 16. For example, the processor 12 may receive a 'still photo' image from the image sensor 16 and/or a plurality of images/frames sequentially that form a video. The image sensor 16 may be, for example, a charge coupled device (CCD) camera or a complementary metal oxide semiconductor (CMOS) camera.

The display 18 is configured to receive and display data from the processor 12. The processor 12 may read data from the memory 14 and provide it to the display 18 for display to a user of the apparatus 10. The processor 12 may also read an image/frame from the image sensor 16 and provide it to the display 18 for display to a user of the apparatus 10. Consequently, the display 18 may function as a view finder for the image sensor 16. The display 18 may be any suitable display and may be, for example, a thin film transistor (TFT) display, a liquid crystal display (LCD) or a light emitting diode (LED) display (for example, an organic light emitting diode (OLED) display).

FIG. 1 also illustrates one or more objects 28 that may emit and/or reflect electromagnetic radiation (visible light for example) to the image sensor 16. The one or more objects 28 are positioned at a distance D from the apparatus 10 (and therefore from the image sensor 16).

Figure 2:
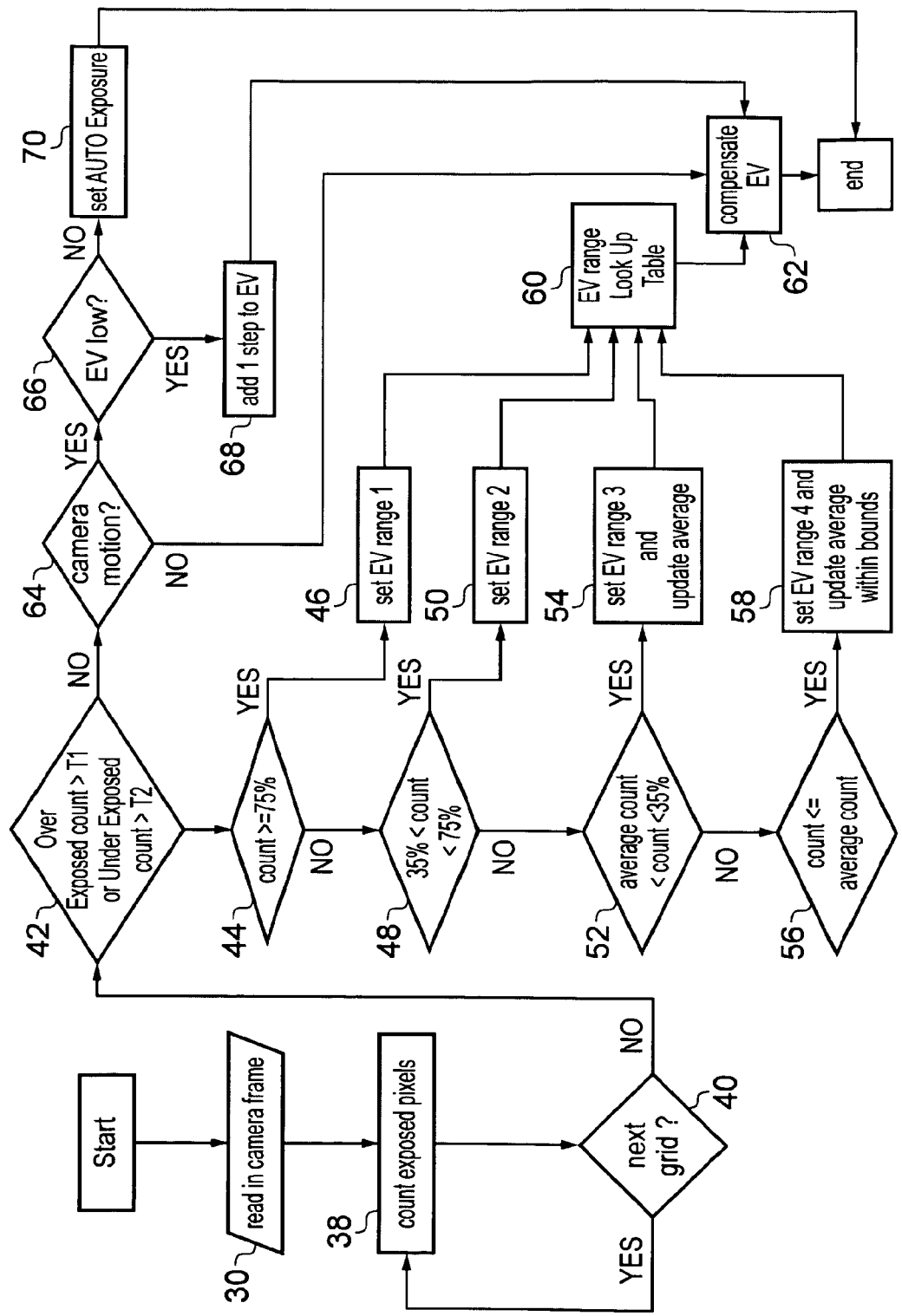
FIG. 2 illustrates a flow diagram of a method of controlling exposure of an image sensor according to various embodiments of the invention.

FIG. 2 illustrates a flow diagram of a method of controlling exposure of the image sensor 16 according to various embodiments of the present invention. The blocks illustrated in the FIG. 2 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Figure 3:
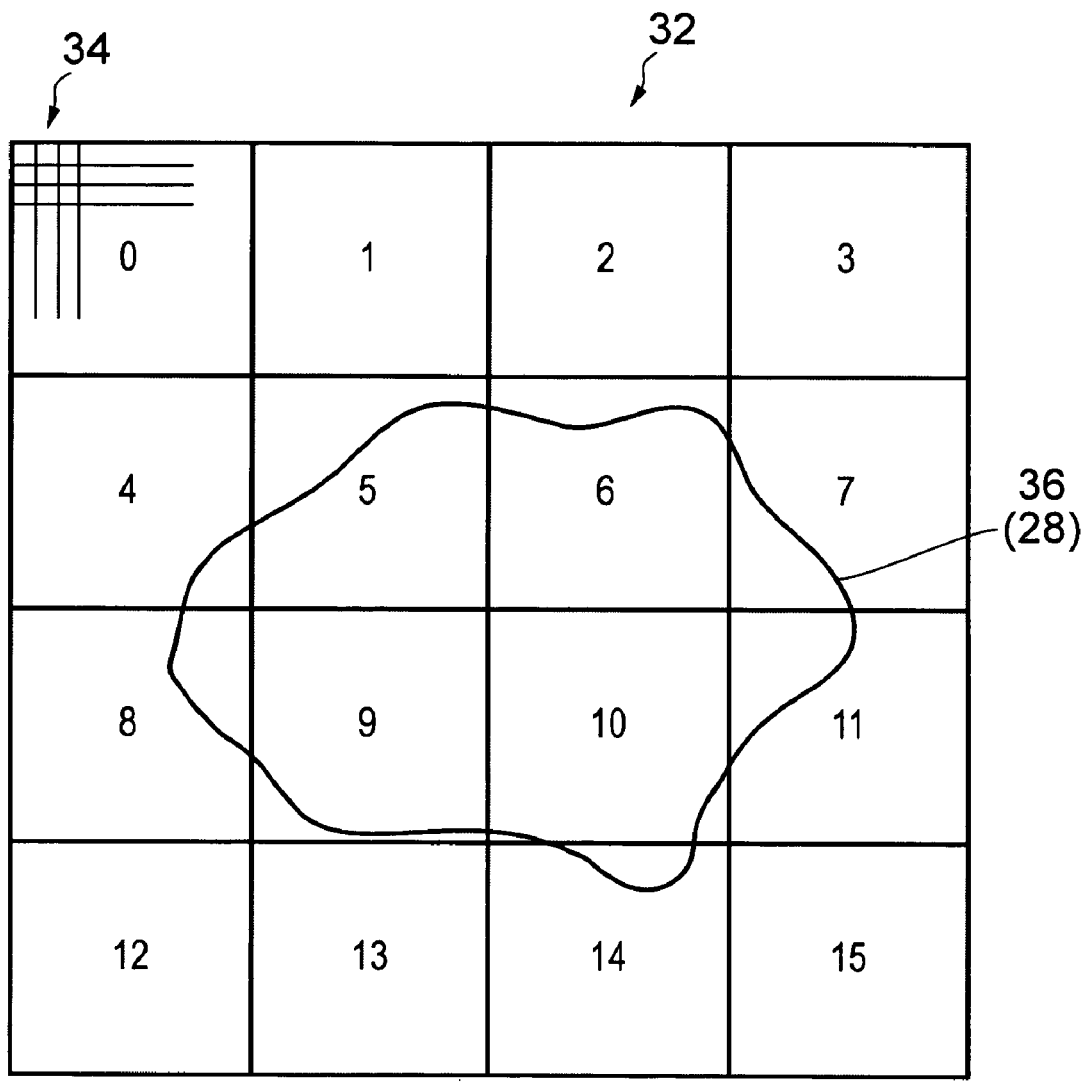
FIG. 3 illustrates a diagram of a frame output by the image sensor according to various embodiments of the invention.

At block 30, the processor 12 reads an image/frame from the image sensor 16 and divides the frame into a four by four grid. FIG. 3 illustrates a diagram of such a frame 32 output by the image sensor 16 according to various embodiments of the invention. The frame 32 comprises a plurality of pixels 34 and the grids are numbered zero to fifteen in FIG. 3 to aid understanding of embodiments of the invention. The frame 32 includes a portion 36 that is an image of the one or more objects 28. The portion 36 extends across the fourth, fifth, sixth, seventh, eighth, ninth, tenth, eleventh and fourteenth grids.

At block 38, the processor 12 counts the number of overexposed and the number of underexposed pixels in the grid numbered zero. A pixel may range in intensity from zero to two hundred fifty five. A pixel may be defined as overexposed if it has an intensity greater than a first predetermined threshold (two hundred and fifty four for example) and may be considered underexposed if it has an intensity less than a second predetermined threshold (twenty for example).

At block 40, the processor 12 determines if there are any remaining grids that require the number of overexposed and the number of underexposed pixels counted. If there are grids that have not been counted, the methods returns to block 38 until all (or all desired) grids have been counted. Once all grids have been counted, the method moves to block 42.

At block 42, the processor 12 determines, for the whole frame 32, whether the overexposed pixel count exceeds a first threshold count (T1) or whether the underexposed pixel count exceeds a second threshold count (T2). If the overexposed or underexposed pixel count is greater than the first or second threshold count respectively, the method moves to block 44.

At block 44, the processor 12 determines whether the overexposed/underexposed pixel count is greater than seventy five percent and if so, the processor 12 sets the exposure value at a first range (block 46). If the overexposed/underexposed pixel count is less than seventy five percent the method moves to block 48.

At block 48, the processor 12 determines whether the overexposed/underexposed pixel count is less than seventy five percent and greater than thirty five percent. If so, the processor 12 sets the exposure value at a second range (block 50). If the overexposed/underexposed pixel count is less than thirty five percent the method moves to block 52.

At block 52, the processor 12 determines whether the overexposed/underexposed pixel count is less than thirty five percent and greater than an average count percentage. The average count percentage may be equal to twenty five percent plus the current count divided by two. If so, the processor 12 sets the exposure value at a third range (block 54) and updates the average count percentage. If the overexposed/underexposed pixel count is less than thirty five percent the method moves to block 56.

At block 56, the processor 12 determines whether the overexposed/underexposed pixel count is less than the average count percentage. If so, the processor 12 sets the exposure value at a fourth range (block 58) and updates the average count percentage.

At block 60, the processor 12 uses the set exposure value (blocks 46, 50, 54, 58) to determine the control required to control the exposure of the image sensor 16 to compensate for overexposure/underexposure. As illustrated in FIG. 1, the memory 14 includes a database 25 that includes a look-up table of set exposure values or ranges of values and their corresponding control parameters for the exposure of the image sensor 16.

At block 62, the processor 12 interrogates the database 25 to obtain one or more control parameters given a determined set exposure value. An alternative and equivalent method is to compute the control parameters by plugging the determined set exposure values into an interpolation formula rather than reading from a database. In this case the correct control parameter is interpolated between the minimum and maximum values allowed by the camera aperture. The processor 12 then uses the obtained one or more control parameters to control the exposure of the image sensor 16. For example, the processor 12 may use one or more control parameters to change the exposure time and/or apertures size of the image sensor 16.

By way of example, the processor 12 may determine that the percentage count of overexposed pixels in the frame 32 is greater than seventy five percent. The processor 12 then uses exposure value range one to interrogate the database 25 to determine the corresponding control parameter(s). The processor 12 then uses the control parameters to control the image sensor 16 and reduce the exposure of the image sensor 16 to reduce the percentage count of overexposed pixels.

At block 62, the processor 12 may determine the distance (D) of the one or more objects 28 from the image sensor 16 using the received image/frame 32 and control the exposure of the image sensor 16 using the determined distance. The processor 12 may determine the distance (D) of the one or more objects by determining what percentage of the frame 32 the portion 36 (representing the object 28) occupies. If the portion 36 occupies fifty to seventy five percent of the frame 32, the processor 12 determines that the one or more objects are less than 0.9 meters from the image sensor 16. If the processor 12 determines that the one or more objects are relatively close (less than 0.9 meters away for example), the processor 12 may reduce the exposure time or aperture size of the image sensor 16.

In various embodiments, the processor 12 determines whether the distance of the object 28 from the image sensor 16 is greater than a predetermined threshold distance (0.9 meters for example). If the distance is less than the predetermined distance, the processor 12 controls the image sensor 16 using first exposure settings (a first set of exposure values and corresponding control parameters) in the look-up table of the database 25. If the distance is greater than the predetermined distance, the processor 12 may control the image sensor 16 using second exposure settings (a second set of exposure values and corresponding control parameters) in the look-up table of the database 25.

Returning to block 42, if the overexposed count percentage is less than the first threshold and if the underexposed count percentage is less than the second threshold, the method moves to block 64.

At block 64, the processor 12 uses the frame 32 and a previously obtained frame to determine if the apparatus 10 (and the image sensor 16) is moving. For example, the processor 12 may determine that the frame 32 is different to the previously obtained frame (within tolerances), the processor 12 may then determine that the apparatus 10 is moving. If the processor 12 determines that the apparatus 10 is moving, the method continues to block 66. If the processor 12 determines that the apparatus 10 is not moving, the method moves to block 62.

At block 66, the processor 12 determines if the currently set exposure value is low. If the exposure value is low, the method moves to block 68.

At block 68, one step is added to the exposure value. For example, if the current exposure value is 1 EV, the processor 12 changes the exposure value to 2 EV and then moves to block 62 to compensate the exposure of the image sensor 16.

If the exposure value determined in block 66 is high, the method moves to block 70 and the image sensor 16 is set to Auto Exposure.

Embodiments of the present invention provide an advantage in that they enable an apparatus 10 to determine if a frame 32 is overexposed or underexposed and to compensate for the overexposure or underexposure in real time for subsequent images/frames. The compensation of the exposure of the image sensor 16 may be applied to all of the pixels of the image sensor 16 or to a subset of pixels (e.g. a grid, or a segment (a plurality of grids). For example, if the portion 36 corresponding to the object 28 is positioned in the centre of the frame 32, the processor 12 may compensate the exposure of the image sensor 16 in the segment comprising the fifth, sixth, seventh, ninth and tenth grids.

Where the processor 12 is configured to provide an image recognition function, embodiments of the invention may advantageously improve the accuracy of the image recognition by providing a clear, well exposed frame to the image recognition software executed by the processor 12.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

Appendix

Various embodiments of the invention relate to an effective scale invariant method and system for automatically estimating and compensating for exposure levels at real time. The system may have two components, a method which automatically detects unwanted exposure levels based on intensity statistics of the composition of the saturated or over-exposed regions and estimates exposure levels of the video frames at real time.

Subsequently, the system may further allow the automatic compensation of the exposure levels by applying a table of appropriate exposure values settings via the camera software interface to adjust the exposure for a more desirable analysis of the video frame.

It is also effective in detecting and automatically adjusting for backlit artificial low lighting situations when the camera video mode is in use.

The method and system according to various embodiments of the invention is not restricted to the field of machine vision, vision robotics, pattern recognition systems and video & mobile technology.

This method and system according to various embodiments of the invention may replace the auto exposure feature on the mobile camera device which causes poor recognition performance for the vision recognition engine. The auto exposure does not compensate or converge which generally results in an over exposed video frame in a backlit artificial low lighting or extremely sunny lighting condition.

The resulting frame or image of the scene is unacceptable for analysis by the pattern recognition engine. This method and system according to various embodiments of the invention improves the quality of the video frame in terms of exposure levels acceptable, balanced and adjusted for input into the pattern recognition engine. The method and system allows the camera to stabilize the light source on the camera sensor without the need of the camera auto exposure feature. Using Auto exposure results in unwanted and extended exposure time resulting in high brightness. When setting light cube voltage to 12V. AE uses value ~200 for exposure time and gives almost maximum (251) brightness high results. When adjusting manually exposure time to 100 the brightness value is 170 which is close to correct (=70% of full scale). AE should adjust exposure time so that the brightness high value is 70% of full scale. This causes a variety of problems for the vision recognition engine during analysis. Most vision recognition engines classify this output as a digital 'Dud' unfit for analysis or input sample in an image recognition system. (The voltage had to be dropped to 10.2V to get the brightness high value to correct level. But then the light cube is too dim resulting in underexposed images/frames from the video.

The method and system according to various embodiments of the invention allows the camera to stabilize the light source on the camera sensor without the need of the camera auto exposure feature. The method according to various embodiments of the invention is robust against scale variations and against backlit situations compared to the auto exposure feature. The method and system according to various embodiments accomplishes the scale invariance using a grid-based approach which divides the frame into a 4×4 grid map to depict spatial locality information. This is used to deduce when a user is less than 3 feet away (use case 1) from the target scene or more than 6 feet away (use case 2). The method according to various embodiments is robust against this scale variation resulting in consistent exposure compensation even when the target object or scene at more than 3 feet is backlit. In comparison to the Auto exposure camera feature which uses a centre-metering approach but not robust against this use case #2.

The method and system according to various embodiments uses an evaluative and partitioned approach which divides frame or image into grid map of 16 grids. Each grid is subjected to an intensity threshold of T>=254 (high brightness) and T<=40 (low brightness). Each grid will have detected pixel counts falling under these criteria. The total sum of pixel counts for either cases of exposure levels are taken into account. The method and system according to various embodiments uses a number of components and parameters which require tuning to give desired behavior. This method deduces the spot, partial and centered metering scenarios for situations greater or low than 3 feet from the target scene which either of these method have failed to be effective in adjusting the exposure levels appropriately. The image is divided into four segments (0-25%, 25-50%, 50-75% and >75%) as per estimated grid exposure levels where each segment represents a percentage of the image which meets threshold criterion. This is achieved through the use of a dynamic threshold to deduce the percentage of the image segments which has high or low brightness levels meeting the threshold. These components include a dynamic threshold for over exposed pixel statistics, detection of exposed pixel levels above the threshold [criteria 1], estimation of the exposure levels based on the detected pixel count meeting criteria 1, exposure compensation by application of look up table based on manual exposure value setting applied within four band ranges to the four image segments respectively and dynamic balancing for a smooth perceptual transition of exposure levels. The method according to various embodiments takes into account the camera motion to suspend the setting of new EV ranges until motion is detected.

This method & system according to various embodiments is specifically designed but not restricted to image/pattern recognition systems that are run on video & mobile technology, these method and system can be run at real time for video. Any competitor possessing such a system (recognition engine) will have a visible implementation due to the variation of the brightness levels in artificial or natural lighting of the camera video during runtime. However, in order lay more claims, test tools and opening of product may be required. This system is a method & system which can be categorized as an Auto-Exposure method & system designed specifically for Pattern Recognition systems.

We claim:

1. A method comprising:
receiving image data from an image sensor, the image data including a portion corresponding to an object;
counting a number of overexposed pixels to obtain a first count and a number of underexposed pixels to obtain a second count,
in response to determining that the first count exceeds a first threshold or the second count exceeds a second threshold, setting an exposure for the image sensor to one of a plurality of first ranges based upon a comparison to a plurality of percentage thresholds,
in response to determining that the first count did not exceed or the second count did not exceed the plurality of percentage thresholds and are greater than or less than an average pixel count, setting the exposure for the image sensor to one of a second plurality of ranges based upon a comparison to an average pixel count;
determining distance of the object from the image sensor using the received image data;
controlling exposure of the image sensor based upon the set exposure range; and
compensating the exposure using the determined distance.

2. Apparatus comprising:
a processor; and
a memory including computer program code, where the memory and computer program code are configured, with the processor, to cause the apparatus to
receive image data from an image sensor, the image data including a portion corresponding to an object;
counting a number of overexposed pixels to obtain a first count and a number of underexposed pixels to obtain a second count,
in response to determining that the first count exceeds a first threshold or the second count exceeds a second threshold, setting an exposure for the image sensor to one of a plurality of first ranges based upon a comparison to a plurality of percentage thresholds,
in response to determining that the first count did not exceed or the second count did not exceed the plurality of percentage thresholds and are greater than or less than an average pixel count, setting the exposure for the image sensor to one of a second plurality of ranges based upon a comparison to an average pixel count;
determine distance of the object from the image sensor using the received image;
controlling exposure of the image sensor based upon the based upon the set exposure range; and
compensating the exposure using the determined distance.

3. A portable electronic device comprising an apparatus as claimed in claim 2.

4. A mobile cellular telephone comprising an apparatus as claimed in claims 2.

5. A non-transitory computer readable medium storing a program of machine-readable instructions executable by a digital processing apparatus of a computer system to perform operations for controlling computer system actions, the actions comprising:

receiving image data from an image sensor, the image data including a portion corresponding to an object;

counting a number of overexposed pixels to obtain a first count and a number of underexposed pixels to obtain a second count, in response to determining that the first count exceeds a first threshold or the second count exceeds a second threshold, setting an exposure for the image sensor to one of a plurality of percentage ranges based upon a comparison to a plurality of percentage thresholds, in response to determining that the first count did not exceed or the second count did not exceed the plurality of percentage thresholds and are greater than or less than an average pixel count, setting the exposure for the image sensor to one of a plurality of average ranges based upon a comparison to an average pixel count;

determining distance of the object from the image sensor using the received image;

controlling exposure of the image sensor based upon based upon the set exposure range; and compensating the exposure using the determined distance.

6. A method as claimed in claim 1, where setting an exposure for the image sensor to one of a plurality of first ranges based upon a comparison to a plurality of percentage thresholds comprises:

determining how many pixels of the subset of pixels have an intensity that exceeds a first threshold intensity and setting a first exposure value at a first range based upon the determined number of pixels that have an intensity that exceeds the first threshold intensity; and determining how many pixels of the subset of pixels have an intensity that is less than the first threshold intensity and greater than a second threshold intensity and setting a second exposure value at a second range based upon the determined number of pixels that have an intensity that is less than the first threshold intensity and greater than the second threshold intensity.

7. A method as claimed in claim 6, where setting the exposure for the image sensor to one of a plurality of average ranges based upon a comparison to an average pixel count comprises:

determining how many pixels of the subset of pixels have an intensity that is less than the second threshold intensity and greater than an average count percentage and setting a third exposure value at a third range based upon the determined number of pixels that have an intensity that is less than the second threshold intensity and greater than the average count percentage; and determining how many pixels of the subset of pixels have an intensity that is less than the average count percentage and setting a third exposure value at a fourth range based upon the determined number of pixels that have an intensity that is less than the average count percentage.

8. A method as claimed in claim 6, further comprising the step of:

accessing a database that includes a look-up table of the set exposure values and corresponding control parameters for the exposure of the image sensor.

9. A method as claimed in claim 8, further comprising the step of:

interrogating the database to obtain one or more control parameters given at the determined set exposure value.

10. A method as claimed in claim 6, further comprising the step of:

computing a control parameters by plugging in the set exposure values into an interpolation formula.

11. A method as claimed in claim 7, further comprising the step of:

determining if the image sensor is moving based upon the determination that the overexposed pixel count is less than the first threshold count and the underexposed pixel count is less than the second threshold count, wherein if a currently set exposure value is low adding an exposure value and if a currently set exposure value is high setting the image sensor to auto exposure.

12. An Apparatus as claimed in claim 2, where setting an exposure for the image sensor to one of a second plurality of ranges based upon a comparison to a plurality of percentage thresholds comprises:

determining how many pixels of the subset of pixels have an intensity that exceeds a first threshold intensity and setting a first exposure value at a first range based upon the determined number of pixels that have an intensity that exceeds the first threshold intensity; and determining how many pixels of the subset of pixels have an intensity that is less than the first threshold intensity and greater than a second threshold intensity and setting a second exposure value at a second range based upon the determined number of pixels that have an intensity that is less than the first threshold intensity and greater than the second threshold intensity.

13. An Apparatus as claimed in claim 2, where setting the exposure for the image sensor to one of a plurality of first ranges based upon a comparison to an average pixel count comprises:

determining how many pixels of the subset of pixels have an intensity that is less than the second threshold intensity and greater than an average count percentage and setting a third exposure value at a third range based upon the determined number of pixels that have an intensity that is less than the second threshold intensity and greater than the average count percentage; and determining how many pixels of the subset of pixels have an intensity that is less than the average count percentage and setting a third exposure value at a fourth range based upon the determined number of pixels that have an intensity that is less than the average count percentage.

14. An Apparatus as claimed in claim 12, where the memory is comprises a database that includes a look-up table of the set exposure values or ranges of values and corresponding control parameters for the exposure of the image sensor.

15. An Apparatus as claimed in claim 14, where the memory and computer program code are further configured, with the processor, to cause the apparatus to interrogate the database to obtain one or more control parameters given at the determined set exposure value.

16. An Apparatus as claimed in 12, where the memory and computer program code are further configured, with the processor, to cause the apparatus to compute a control parameters by plugging the determined set exposure values into an interpolation formula.

17. An Apparatus as claimed in claim 12, where the memory and computer program code are further configured, with the processor, to cause the apparatus to determining if the image sensor is moving based upon the determination that the overexposed pixel count is less than the first threshold count and the underexposed pixel count is less than the second threshold count, wherein if a currently set exposure value is low adding an exposure value and if a currently set exposure value is high setting the image sensor to auto exposure.

18. The non-transitory computer readable medium of claim 5, where setting an exposure for the image sensor to one of a plurality of percentage ranges based upon a comparison to a second plurality of thresholds comprises:

determining how many pixels of the subset of pixels have an intensity that exceeds a first threshold intensity and setting a first exposure value at a first range based upon the determined number of pixels that have an intensity that exceeds the first threshold intensity; and determining how many pixels of the subset of pixels have an intensity that is less than the first threshold intensity and greater than a second threshold intensity and setting a second exposure value at a second range based upon the determined number of pixels that have an intensity that is less than the first threshold intensity and greater than the second threshold intensity.

19. The non-transitory computer readable medium of claim 5, where setting the exposure for the image sensor to one of a plurality of first ranges based upon a comparison to an average pixel count comprises:

determining how many pixels of the subset of pixels have an intensity that is less than the second threshold intensity and greater than an average count percentage and setting a third exposure value at a third range based upon the determined number of pixels that have an intensity that is less than the second threshold intensity and greater than the average count percentage; and determining how many pixels of the subset of pixels have an intensity that is less than the average count percentage and setting a third exposure value at a fourth range based upon the determined number of pixels that have an intensity that is less than the average count percentage.

20. The non-transitory computer readable medium in claim 18, the actions further comprising:

accessing a database that includes a look-up table of the set exposure values or ranges of values and corresponding control parameters for the exposure of the image sensor.

\* \* \* \* \*

UNITED STATES PATENT AND TRADEMARK OFFICE
CERTIFICATE OF CORRECTION

| | | |
|---|---|---|
| PATENT NO. | : 8,212,891 B2 | Page 1 of 1 |
| APPLICATION NO. | : 12/459081 | |
| DATED | : July 3, 2012 | |
| INVENTOR(S) | : Bamidele et al. | |

It is certified that error appears in the above-identified patent and that said Letters Patent is hereby corrected as shown below:

Claim 2, col. 8, lines 59-60 delete "the based upon"

Claim 5, col. 9, line 22 delete "based upon"

Signed and Sealed this
Second Day of October, 2012

David J. Kappos
*Director of the United States Patent and Trademark Office*